US012092977B1

(12) United States Patent
Endo

(10) Patent No.: US 12,092,977 B1
(45) Date of Patent: Sep. 17, 2024

(54) FIXING DEVICE WITH CONTACT PORTIONS HAVING DIFFERENT CONTACT AREAS

(71) Applicant: Toshiba Tec Kabushiki Kaisha, Tokyo (JP)

(72) Inventor: Sasuke Endo, Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/119,203

(22) Filed: Mar. 8, 2023

(51) Int. Cl.
*G03G 15/20* (2006.01)
*G03G 15/00* (2006.01)

(52) U.S. Cl.
CPC ..... *G03G 15/2053* (2013.01); *G03G 15/2017* (2013.01); *G03G 15/2039* (2013.01); *G03G 15/5045* (2013.01); *G03G 2215/2009* (2013.01); *G03G 2215/2016* (2013.01); *G03G 2215/2035* (2013.01)

(58) Field of Classification Search
CPC ......... G03G 615/2028; G03G 15/2057; G03G 15/2064; G03G 15/2053; G03G 15/2017; G03G 2215/2016; G03G 2215/2035; G03G 2215/2041; G03G 15/5045; G03G 2215/2009; G03G 15/2039
See application file for complete search history.

(56) References Cited

U.S. PATENT DOCUMENTS

2004/0136754 A1* 7/2004 Yamamoto ......... G03G 15/0194 399/223
2004/0218949 A1* 11/2004 Fukuzawa .......... G03G 15/2053 399/328
2014/0294417 A1* 10/2014 Matsuno ............ G03G 15/2042 399/68
2016/0033908 A1* 2/2016 Tsunashima ......... G03G 15/206 399/329
2019/0286026 A1 9/2019 Furuichi et al.
2019/0286027 A1 9/2019 Someya et al.
2020/0209791 A1 7/2020 Seki
2021/0132526 A1 5/2021 Miyashita et al.

FOREIGN PATENT DOCUMENTS

JP 2001-066925 A 3/2001
JP 2015-004918 A 1/2015
JP 2016-186569 A 10/2016
JP 2017-072781 A 4/2017

* cited by examiner

*Primary Examiner* — Arlene Heredia
*Assistant Examiner* — Laura Roth
(74) *Attorney, Agent, or Firm* — FOLEY & LARDNER LLP

(57) ABSTRACT

A fixing device includes a film forming a cylinder, a heater, a thermometer, and a series of contact portions. The heater extends within the cylinder and includes a heating element that extends in a longitudinal direction along the cylinder. The thermometer detects a temperature of the cylinder. The plurality of contact portions contact an inner surface of the cylinder and are spaced apart from each other in the longitudinal direction. The contact portions include a first contact portion and a second contact portion. The first contact portion is longitudinally offset from the thermometer and has a first contact area with the cylinder. The second contact portion is longitudinally collocated with the thermometer and has a second contact area with the cylinder. The second contact area is smaller than the first contact area.

20 Claims, 9 Drawing Sheets

FIXING DEVICE WITH CONTACT PORTIONS HAVING DIFFERENT CONTACT AREAS

FIELD

Embodiments described herein relate generally to a fixing device.

BACKGROUND

An image forming apparatus that forms an image on a sheet is used. The image forming apparatus includes a fixing device that heats toner (e.g., a recording agent) to fix the toner to a sheet. For example, the fixing device heats the toner through a film-shaped cylinder. A fixing device that can control the cylinder to an appropriate temperature is required.

DETAILED DESCRIPTION

In general, according to one embodiment, a fixing device includes a film forming a cylinder, a heater, a thermometer, and a plurality of contact portions (which may be in series). The contact portions include a first contact portion and a second contact portion. The heater extends within the cylinder and includes a heating element that extends in a longitudinal direction along the cylinder. The thermometer detects a temperature of the cylinder. The contact portions contact an inner surface of the cylinder and are spaced apart from each other in the longitudinal direction. The first contact portion is longitudinally offset from the thermometer and has a first contact area with the cylinder. The second contact portion is collocated with the thermometer in the longitudinal direction and has a second contact area with the cylinder. The second contact area is smaller than the first contact area.

Figure 1:
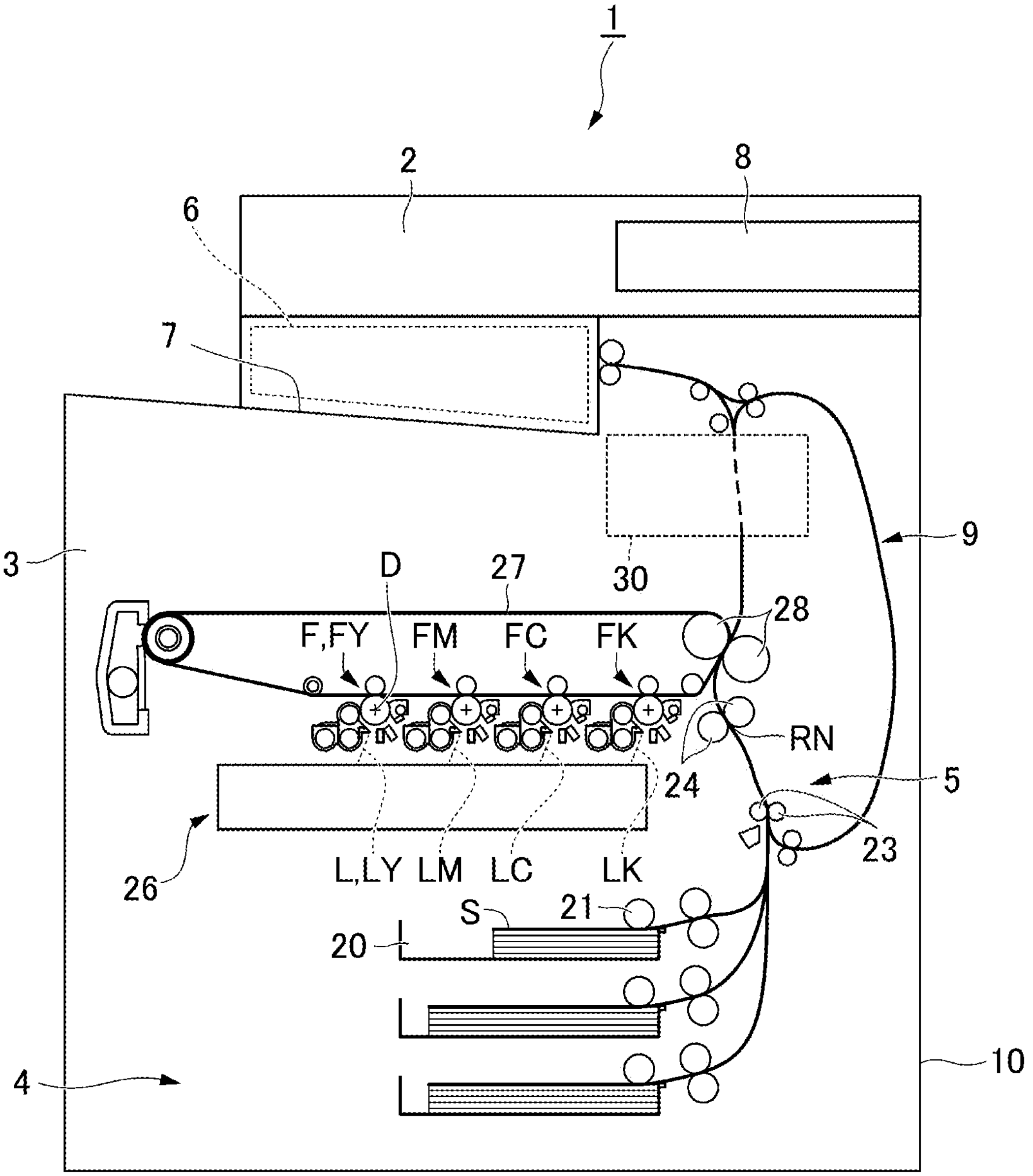
FIG. 1 is a diagram illustrating a schematic configuration of an image processing apparatus.

Hereinafter, a fixing device according to an embodiment will be described. FIG. 1 is a diagram illustrating a schematic configuration of an image forming apparatus. For example, an image forming apparatus 1 is disposed in a workplace. The image forming apparatus 1 executes a process of forming an image on a sheet S. The sheet S may be paper. The image forming apparatus 1 includes a housing

10, a scanner unit 2 (e.g., a scanner or image capture device), an image forming unit 3, a sheet supply unit 4 (sheet supplier), a conveying unit 5 (conveyor), an inversion unit 9, a tray 7, a control panel 8, and a control unit 6 (controller).

The housing 10 forms an external shape of the image forming apparatus 1. The scanner unit 2 reads image information of an object to be copied based on brightness and darkness of light and generates an image signal. The scanner unit 2 outputs the generated image signal to the image forming unit 3. The image forming unit 3 forms a toner image based on an image signal from the scanner unit 2 or an external device. The toner image is an image formed of toner or another material. The image forming unit 3 transfers the toner image to a surface of the sheet S. The image forming unit 3 applies heat and pressure to the toner image on the surface of the sheet S such that the toner image is fixed to the sheet S.

The sheet supply unit 4 supplies the sheet S to the conveying unit 5 one by one at a timing at which the image forming unit 3 forms the toner image. The sheet supply unit 4 includes a sheet accommodation unit 20 and a pickup roller 21. The sheet accommodation unit 20 (e.g., a sheet tray) accommodates the sheet S having a predetermined size and a predetermined type. The pickup roller 21 (e.g., a feed roller) picks up the sheet S from the sheet accommodation unit 20 one by one. The pickup roller 21 supplies the picked sheet S to the conveying unit 5.

The conveying unit 5 (e.g., a conveyor assembly) supplies the sheet S supplied from the sheet supply unit 4 to the image forming unit 3. The conveying unit 5 includes a conveying roller 23 and a registration roller 24. The conveying roller 23 conveys the sheet S supplied from the pickup roller 21 to the registration roller 24. The conveying roller 23 allows a tip of the sheet S in a conveying direction to abut against a nip RN of the registration roller 24. The registration roller 24 aligns a position of the tip of the sheet S in the conveying direction by bending the sheet S in the nip RN. The registration roller 24 conveys the sheet S at a timing at which the image forming unit 3 transfers the toner image to the sheet S.

The image forming unit 3 will be described. The image forming unit 3 includes a plurality of image forming units F, a laser scanning unit 26, an intermediate transfer belt 27, a transfer unit 28, and a fixing device 30. The image forming unit F includes a photoconductive drum D. The image forming unit F forms the toner image corresponding to the image signal on the photoconductive drum D. A plurality of image forming units FY, FM, FC, and FK forms toner images using yellow, magenta, cyan, and black toners, respectively.

The charging unit charges a surface of the photoconductive drum D. The developing unit contains a developer including the yellow, magenta, cyan, and black toners. The developing unit develops an electrostatic latent image on the photoconductive drum D to form the toner image of each of the colors on the photoconductive drum D.

The laser scanning unit 26 deflects a laser beam L for scanning the charged photoconductive drum D such that the photoconductive drum D is exposed. The laser scanning unit 26 exposes the photoconductive drums D of the image forming units FY, FM, FC, and FK of the respective colors to laser beams LY, LM, LC, and LK, respectively, to form electrostatic latent images thereon.

The toner image on the surface of the photoconductive drum D is primarily transferred to the intermediate transfer belt 27. The transfer unit 28 transfers the toner image primarily transferred to the intermediate transfer belt 27 to the surface of the sheet S at a secondary transfer position.

The fixing device 30 (e.g., a fixing assembly) executes the fixing process. The fixing process is a process of applying heat and pressure to the toner image transferred to the sheet S such that the toner image is fixed to the sheet S.

The inversion unit 9 (e.g., an inverter) inverts the sheet S for forming an image on a back surface of the sheet S. The inversion unit 9 switches back the sheet S discharged from the fixing device 30 to invert front and back surfaces of the sheet S. The inversion unit 9 conveys the inverted sheet S to the registration roller 24. In the tray 7 (e.g., an output tray or collection tray), the discharged sheet S on which the image is formed is placed. The control panel 8 (e.g., a user interface) is a part of an input unit that inputs information for allowing an operator to operate the image forming apparatus 1. The control panel 8 includes a touch panel and various hard keys.

Figure 2:
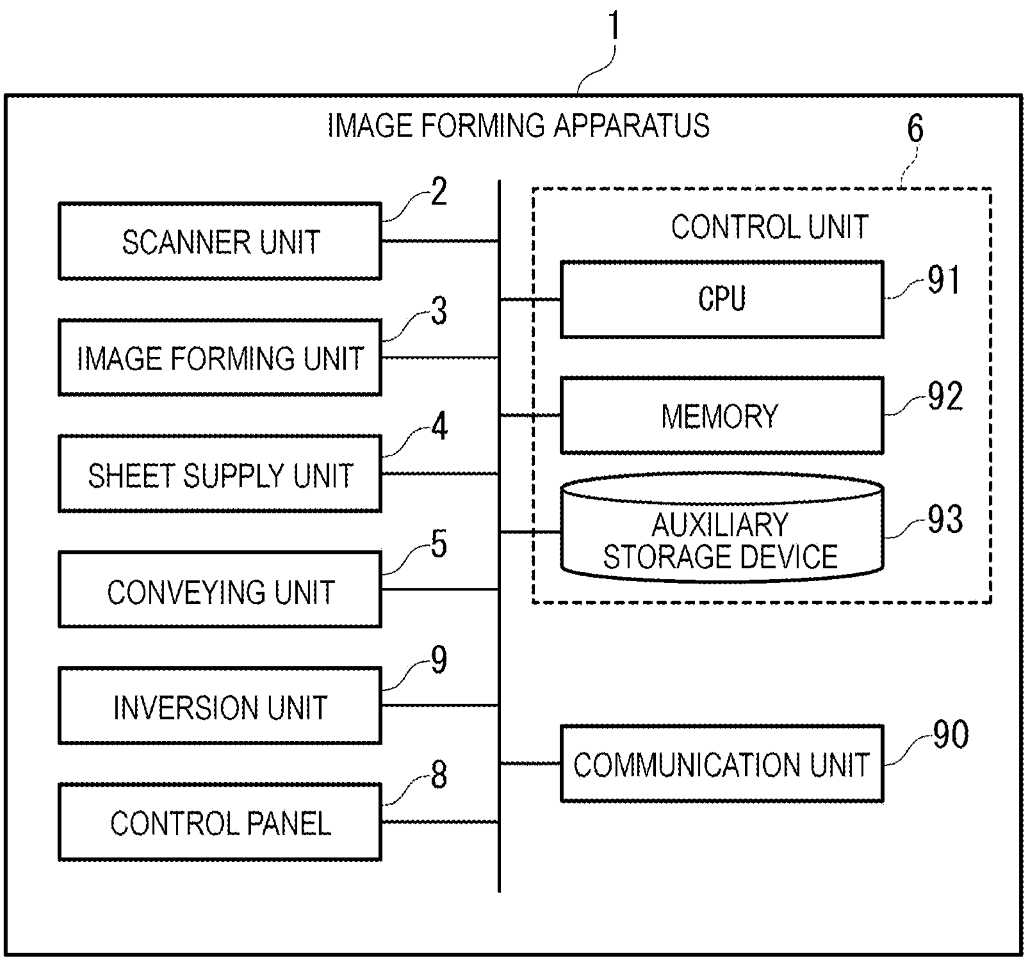
FIG. 2 is a diagram illustrating a hardware configuration of the image forming apparatus.

The control unit 6 (e.g., a controller) controls operations of the respective units of the image forming apparatus 1. FIG. 2 is a diagram illustrating a hardware configuration of the image processing apparatus according to the embodiment. The image forming apparatus 1 includes a Central Processing Unit (CPU) 91 (e.g., a processor), a memory 92, and an auxiliary storage device 93 connected through a bus and executes a program. By executing the program, the image forming apparatus 1 functions as an apparatus (e.g., a multi-function peripheral or multi-function printer) including the scanner unit 2, the image forming unit 3, the sheet supply unit 4, the conveying unit 5, the inversion unit 9, the control panel 8, and a communication unit 90.

The CPU 91 functions as the control unit 6 by executing a program stored in the memory 92 and the auxiliary storage device 93. The control unit 6 controls operations of the respective functional units of the image forming apparatus 1. The auxiliary storage device 93 is configured using a storage device such as a magnetic hard disk device or a semiconductor memory device. The auxiliary storage device 93 stores information. The communication unit 90 includes a communication interface for connecting the image forming apparatus to an external apparatus. The communication unit 90 communicates with the external apparatus via the communication interface.

Figure 3:
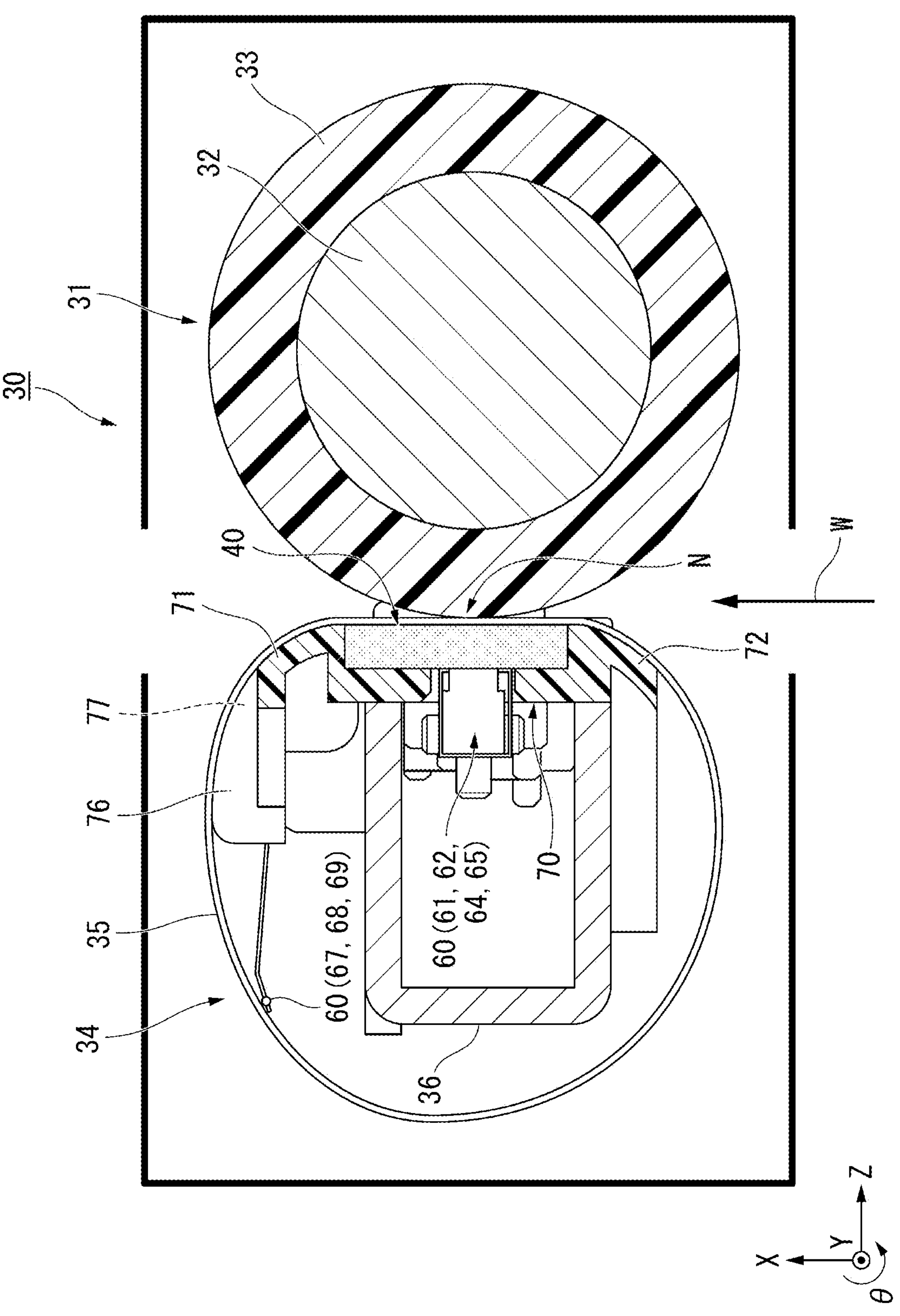
FIG. 3 is a front cross-sectional view illustrating a fixing device.

The fixing device 30 will be described in detail. FIG. 3 is a front cross-sectional view illustrating the fixing device 30 taken along line III-III of FIG. 6. The fixing device 30 includes a pressurization roller 31 and a heating roller 34. A nip N is formed between the pressurization roller 31 and the heating roller 34.

In the present application, a Z direction, an X direction, and the Y direction are defined as follows. The Z direction is a thickness direction of a substrate 41 of a heater unit 40 and is a direction perpendicular to the heating roller 34 and the pressurization roller 31. The +Z direction is a direction from the heating roller 34 toward the pressurization roller 31. The X direction is a transverse direction of the substrate 41 and is the conveying direction of the sheet S in the nip N. The +X direction is the downstream side in the conveying direction of the sheet S. The Y direction is a longitudinal direction of the substrate 41 and is an axis direction of a cylindrical film 35 of the heating roller 34.

The pressurization roller 31 pressurizes the toner image of the sheet S in the nip N. The pressurization roller 31 includes a core 32 and an elastic layer 33. The configuration of the pressurization roller 31 is not particularly limited to the above-described example, and various configurations can be adopted.

The core 32 is formed of a metal material such as stainless steel in a cylindrical shape. The elastic layer 33 is formed of an elastic material such as a silicone rubber. The elastic layer 33 has a given thickness on an outer circumferential surface of the core 32. The release layer is formed of a resin material such as a tetrafluoroethylene-perfluoroalkyl vinyl ether copolymer (PFA), and may be provided on an outer circumferential surface of the elastic layer 33.

The pressurization roller 31 is driven to rotate by a motor. If the pressurization roller 31 rotates in a state where the nip N is formed, the cylindrical film 35 of the heating roller 34 is driven to rotate. If the pressurization roller 31 rotates in a state where the sheet S is present in the nip N, the pressurization roller 31 conveys the sheet S in a conveying direction W.

In the present application, a θ direction is a circumferential direction of the cylindrical film 35. The +θ direction is the downstream side in a rotation direction of the cylindrical film 35. In the rotation direction of the cylindrical film 35, the downstream side will be simply referred to as "downstream side", and the upstream side will be simply referred to as "upstream side".

The heating roller 34 heats the toner image of the sheet S entered the nip N. The heating roller 34 includes the cylindrical film 35 (e.g., a hollow cylinder or tubular member), the heater unit 40, a support member 70, a frame 36, and a thermosensitive element 60. The configuration of the heating roller 34 is not particularly limited to the above-described example, and various configurations can be adopted.

The cylindrical film 35 is cylindrical. The cylindrical film 35 includes a base layer, an elastic layer, and a release layer in order from the inner circumferential side. The base layer is formed of a resin material such as polyimide (PI) in order to achieve low thermal capacity. The elastic layer is formed of an elastic material such as a silicone rubber. The release layer is formed of a material such as a PFA resin. A center portion of the cylindrical film 35 in the Y direction is in a tensionless state in the θ direction.

Figure 4:
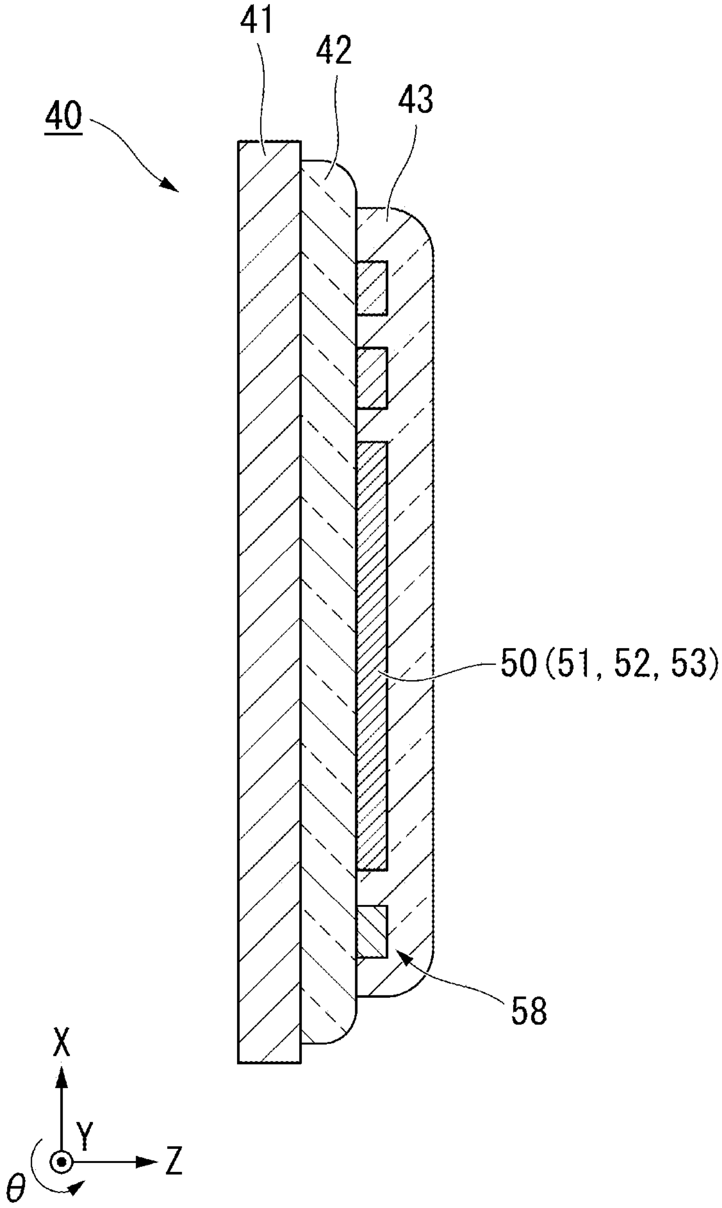
FIG. 4 is a front cross-sectional view illustrating a heater unit.
Figure 5:
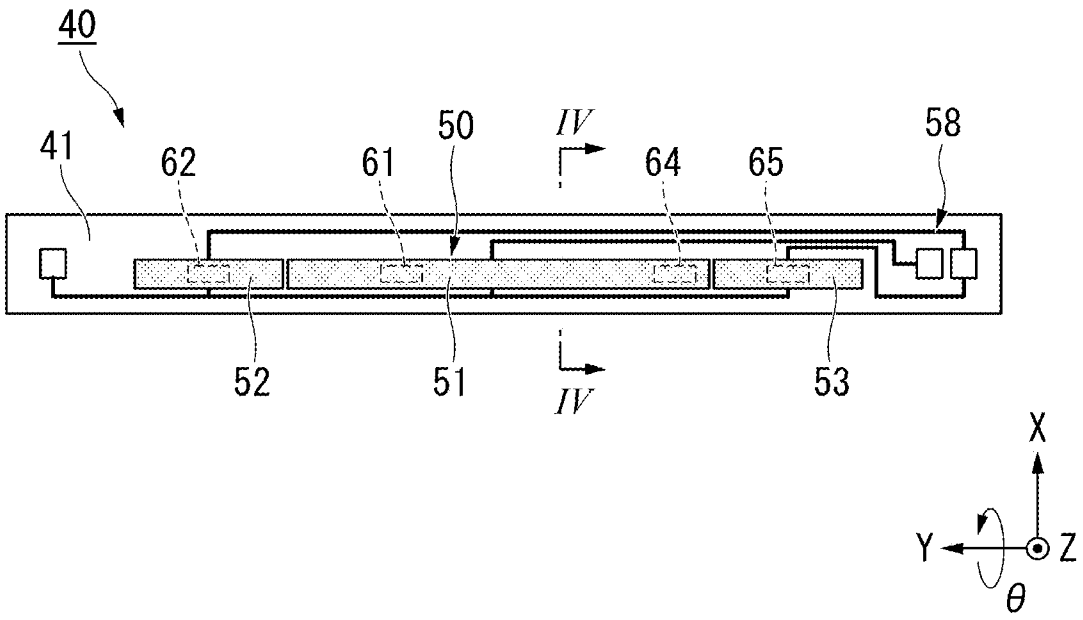
FIG. 5 is a side view illustrating the heater unit.

The heater unit 40 (e.g., a heater) is provided inside the cylindrical film 35. A surface of the heater unit 40 in the +Z direction comes into contact with an inner surface of the cylindrical film 35 through a grease. FIG. 4 is a front cross-sectional view illustrating the heater unit 40 taken along line IV-IV of FIG. 5. FIG. 5 is a side view illustrating the heater unit 40. The heater unit 40 includes the substrate 41, a heating element 50, and a wiring 58.

The substrate 41 is formed of, for example, a metal material such as stainless steel or a ceramic material such as aluminum nitride. As illustrated in FIG. 5, the substrate 41 has an elongated rectangular plate shape. The longitudinal direction of the substrate 41 is the axis direction of the cylindrical film 35. As illustrated in FIG. 4, an insulating layer 42 is formed of a glass material or the like on a surface of the substrate 41 in the +Z direction. As in the insulating layer 42 that is formed on the substrate 41 in the +Z direction, an insulating layer may be formed on the substrate 41 in the −Z direction.

The heating element 50 (e.g., a resistive heating element, a resistive heater) is formed of a silver-palladium alloy or the like. The heating element 50 is energized to generate heat. The heating element 50 and the wiring 58 are disposed on the surface of the substrate 41 in the +Z direction through the insulating layer 42. A protective layer 43 is formed of a glass material or the like to cover the heating element 50 and the wiring 58. As in the protective layer 43 that is formed on the substrate 41 in the +Z direction, a protective layer may be formed on the substrate 41 in the −Z direction.

As illustrated in FIG. 5, a longitudinal direction of the heating element 50 is the axis direction of the cylindrical film 35. The heating element 50 includes a center heating element 51 and a pair of end heating elements 52 and 53 as heating element segments. The center heating element 51 is disposed in the center portion in the Y direction. The pair of end heating elements 52 and 53 are positioned on opposite outer sides of the center heating element 51 in the Y direction. The center heating element 51 and the pair of end heating elements 52 and 53 control heat generation independently of each other. The pair of end heating elements 52 and 53 control heat generation in the same manner (e.g., simultaneously and similarly, are controlled together, etc.).

The support member 70 is formed of a resin material such as a liquid crystal polymer. As illustrated in FIG. 3, the support member 70 supports the heater unit 40 in the −Z direction of the heater unit 40.

In the Z direction, a heat transfer member (e.g., a heat sink) may be provided between the heater unit 40 and the support member 70. The heat transfer member is formed of a metal material having a high thermal conductivity such as copper. The external shape of the heat transfer member is the same as the external shape of the substrate 41 of the heater unit 40. The heat transfer member alleviates a temperature distribution of the heater unit 40 in the Y direction.

The frame 36 is formed of a steel sheet material or the like. The frame 36 is provided inside the cylindrical film 35. A cross-section of the frame 36 perpendicular to the Y direction has a U-shape. The frame 36 is mounted on the support member 70 in the −Z direction such that a U-shaped opening portion is covered with the support member 70. The frame 36 extends in the Y direction. Opposite end portions of the frame 36 in the Y direction are fixed to the housing 10 of the image forming apparatus 1. The frame 36 supports the heater unit 40 through the support member 70.

The thermosensitive element 60 (e.g., temperature sensors) includes heater thermometers 61 and 62, thermostats 64 and 65, and film thermometers 67, 68, and 69. For example, the heater thermometers 61 and 62 and the film thermometers 67, 68, and 69 are thermistors. The heater thermometers 61 and 62 and the thermostats 64 and 65 are disposed in the −Z direction with respect to the support member 70. The heater thermometers 61 and 62 and the thermostats 64 and 65 detect the temperature of the heater unit 40 through a through hole of the support member 70. If the detected temperature of the heater unit 40 exceeds a predetermined temperature, the thermostats 64 and 65 interrupt energization of the heating element 50.

As illustrated in FIG. 5, the heater thermometers 61 and 62 include the center heater thermometer 61 and the end heater thermometer 62. The center heater thermometer 61 is disposed in the −Z direction with respect to the center heating element 51 (e.g., overlaps the center heating element 51). The center heater thermometer 61 detects the temperature of the center portion of the heater unit 40 in the Y direction. The end heater thermometer 62 is disposed in the −Z direction with respect to the first end heating element 52 among the pair of end heating elements 52 and 53 (e.g., overlaps the first end heating element 52). The end heater thermometer 62 detects the temperature of an end portion of the heater unit 40 in the Y direction.

The thermostats 64 and 65 include the center thermostat 64 and the end thermostat 65. The center thermostat 64 is disposed in the −Z direction with respect to the center heating element 51 (e.g., overlaps the center heating element 51). The center thermostat 64 detects the temperature of the center portion of the heater unit 40 in the Y direction. The end thermostat 65 is disposed in the −Z direction with respect to the second end heating element 53 among the pair of end heating elements 52 and 53 (e.g., overlaps the second end heating element 53). The end thermostat 65 detects the temperature of an end portion of the heater unit 40 in the Y direction.

As illustrated in FIG. 3, the film thermometers 67, 68, and 69 come into contact with an inner circumferential surface of the cylindrical film 35 to detect the temperature of the cylindrical film 35. The film thermometers 67, 68, and 69 detect the temperature of the cylindrical film 35 in the +θ direction of the heater unit 40 (e.g., detect the temperature of the cylindrical film 35 after the cylindrical film 35 exits the nip N).

Figure 6:
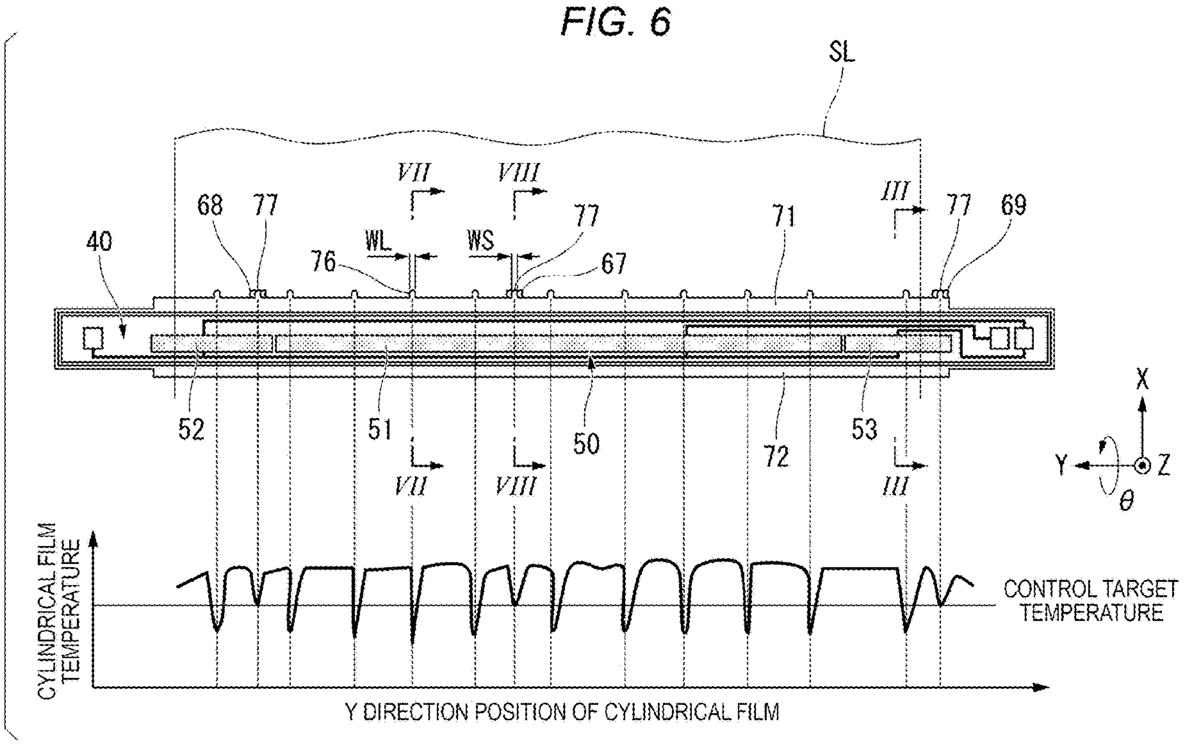
FIG. 6 is a side view illustrating the periphery of the heater unit and is a graph illustrating a temperature distribution of a cylindrical film.

FIG. 6 is a side view illustrating the periphery of the heater unit 40 and is a graph illustrating a temperature distribution of the cylindrical film 35. FIG. 6 does not illustrate the cylindrical film 35 and illustrates an internal configuration member of the cylindrical film 35. The film thermometers 67, 68, and 69 include the center film thermometer 67, the end film thermometer 68, and the external film thermometer 69. The center film thermometer 67 is disposed in the +θ direction with respect to the center heating element 51. The center film thermometer 67 detects the temperature of the center portion of the cylindrical film 35 in the Y direction. The end film thermometer 68 is disposed in the +θ direction with respect to the first end heating element 52 among the pair of end heating elements 52 and 53. The end film thermometer 68 detects the temperature of an end portion of the cylindrical film 35 in the Y direction.

The control unit 6 perceives target temperatures of the center film thermometer 67 and the end film thermometer 68 depending on the size of the sheet S as a target of the fixing process. The control unit 6 controls the amounts of heat generated from the center heating element 51 and the pair of end heating elements 52 and 53 such that the detected temperatures of the center film thermometer 67 and the end film thermometer 68 approach the target temperatures.

The image forming apparatus 1 forms an image on standard size sheets of various sizes. The standard size sheets of various sizes are conveyed together with the rotation of the cylindrical film 35 while being in contact with an outer surface of the cylindrical film 35 of the fixing device 30. Among the standard size sheets, a standard size sheet having a maximum width in the Y direction is a maximum standard size sheet SL. The external film thermometer 69 is provided on an outer side of the maximum standard size sheet SL in the Y direction. The external film thermometer 69 is disposed in the +θ direction with respect to the end portion of the heating element 50 in the Y direction. The external film thermometer 69 detects the temperature of the cylindrical film 35 on the outer side of the maximum standard size sheet SL in the Y direction.

After the start of the fixing process, a plurality of sheets S pass through the fixing device 30. Since the contact opportunity of the center portion of the cylindrical film 35 in the Y direction with the sheet S is large, the temperature of the center portion of the cylindrical film 35 in the Y direction is not likely to increase. Since the contact opportunity of the end portion of the cylindrical film 35 in the Y direction with the sheet S is small, the temperature of the end portion of the cylindrical film 35 in the Y direction is likely to increase. The control unit 6 causes the external film thermometer 69 to detect the temperature of the cylindrical film 35 on the outer side of the maximum standard size sheet SL in the Y direction. If the temperature is a predetermined value or higher, the control unit 6 causes the amount of heat generated from the pair of end heating elements 52 and 53 to be less than the amount of heat generated from the center heating element 51. In this way, an increase in the temperature of the end portion of the cylindrical film 35 in the Y direction is suppressed.

The heating element 50 includes a plurality of heating element segments 51, 52, and 53 disposed parallel to the Y direction. The plurality of heating element segments 51, 52, and 53 include the center heating element 51 and the pair of end heating elements 52 and 53. The film thermometers 67, 68, and 69 are disposed at different positions from a boundary portion between the plurality of heating element segments 51, 52, and 53 in the Y direction.

Guide portions 71 and 72 (e.g., guides) and contact portions 76 and 77 will be described in detail. The support member 70 includes the guide portions 71 and 72 and the contact portions 76 and 77. The guide portions 71 and 72 and the contact portions 76 and 77 can come into contact with an inner surface of the cylindrical film 35. The guide portions 71 and 72 and the contact portions 76 and 77 guide the rotation of the cylindrical film 35 having a substantially cylindrical shape. As illustrated in FIG. 3, the guide portions 71 and 72 and the contact portions 76 and 77 are integrated with the support member 70 (e.g., the guide portions 71 and 72, the contact portions 76 and 77, and the support member 70 are integrally formed as a single, continuous piece) and are formed of a resin material such as a liquid crystal polymer. The guide portions 71 and 72 and the contact portions 76 and 77 may be provided separately from the support member 70.

The guide portions 71 and 72 are long (e.g., elongated) in the Y direction. In a cross-section perpendicular to the Y direction, the outer circumferences of the guide portions 71 and 72 have a substantially arc shape. The guide portions 71 and 72 are parallel to the heater unit 40 in the 0 direction. The guide portions 71 and 72 include the first guide portion 71 and the second guide portion 72. The first guide portion 71 is disposed in the +θ direction (e.g., the first side, the downstream side) with respect to the heater unit 40. The first guide portion 71 is disposed between the heater unit 40 and the contact portions 76 and 77 in the θ direction. The second guide portion 72 is disposed in the −θ direction (e.g., the second side, the upstream side) with respect to the heater unit 40.

The contact portions 76 and 77 are ribs extending from the first guide portion 71 in the +θ direction. The contact portions 76 and 77 may be ribs extending from the second guide portion 72 in the −θ direction. The contact portions 76 and 77 may be disposed at both of the first guide portion 71 and the second guide portion 72. The contact portions 76 and 77 may be ribs disposed distant from the guide portions 71 and 72. In a cross-section perpendicular to the Y direction, the outer circumferences of the contact portions 76 and 77 have a substantially arc shape. On the outer circumferences of the contact portions 76 and 77, contact surface with the cylindrical film 35 is disposed.

As illustrated in FIG. 6, the plurality of contact portions 76 and 77 are parallel to the Y direction. The plurality of contact portions 76 and 77 are discontinuously disposed distant from each other in the Y direction. The plurality of contact portions 76 and 77 include the first contact portion 76 and the second contact portion 77. The first contact portion 76 is disposed at a different position from the film thermometers 67, 68, and 69 in the Y direction. The second contact portion 77 is disposed at the same position as the film thermometers 67, 68, and 69 in the Y direction. For example, the fixing device 30 according to the embodiment includes three second contact portions 77 including three film thermometers 67, 68, and 69. For example, the plurality of contact portions 76 and 77 are all the first contact portions 76 except the three second contact portions 77. In the Y direction, the second contact portions 77 disposed at the same positions as the film thermometers 67, 68, and 69 are disposed at different positions from a boundary portion between the plurality of heating element segments 51, 52, and 53. As in the second contact portion 77, the first contact portion 76 is disposed at a different position from a boundary portion between the plurality of heating element segments 51, 52, and 53.

Figure 7:
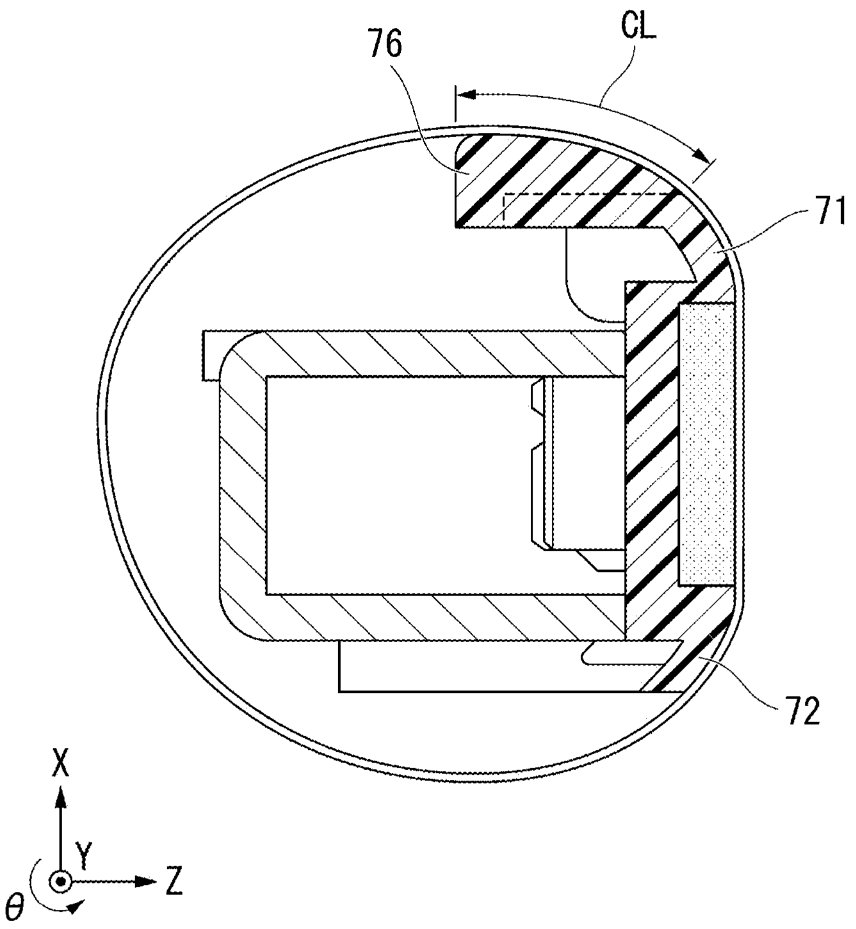
FIG. 7 is a front cross-sectional view taken along line VII-VII of FIG. 6.
Figure 8:
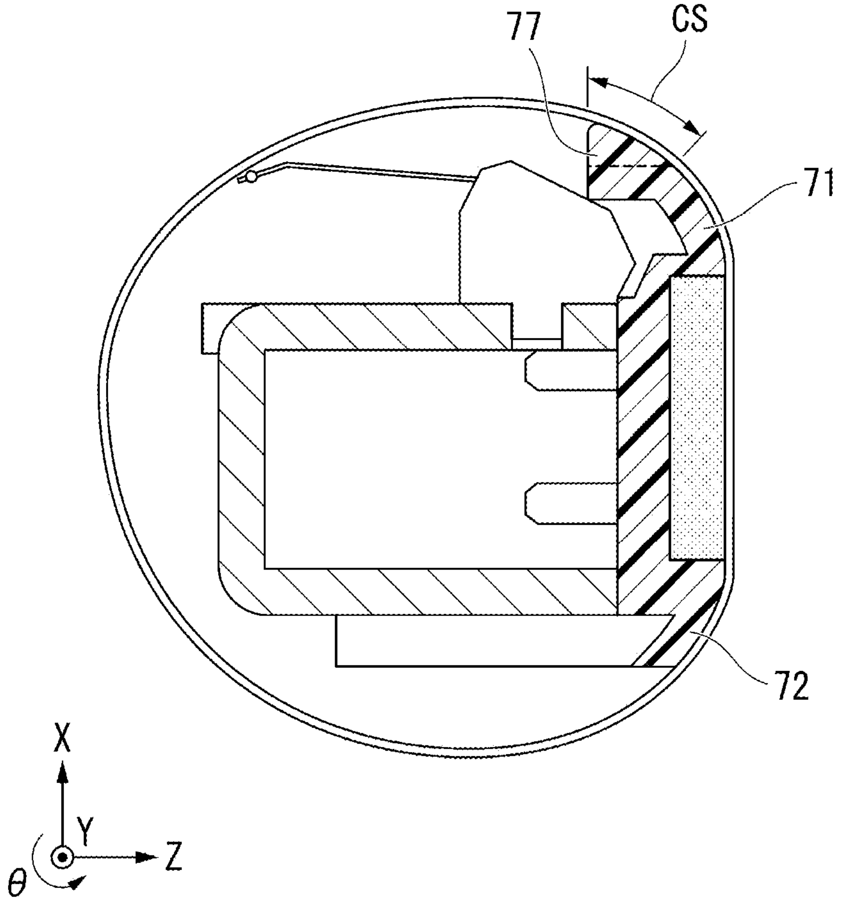
FIG. 8 is a front cross-sectional view taken along line VIII-VIII of FIG. 6.

FIG. 7 is a front cross-sectional view taken along line VII-VII of FIG. 6. FIG. 8 is a front cross-sectional view taken along line VIII-VIII of FIG. 6. The contact area between the second contact portion 77 and the cylindrical film 35 is less than the contact area between the first contact portion 76 and the cylindrical film 35. As illustrated in FIG. 8, the contact length between the second contact portion 77 and the cylindrical film in the θ direction is represented by CS. As illustrated in FIG. 7, the contact length between the first contact portion 76 and the cylindrical film in the θ direction is represented by CL. The contact length CS of the second contact portion 77 is shorter than the contact length CL of the first contact portion 76.

The contact width between the second contact portion 77 and the cylindrical film in the Y direction is represented by WS. The contact width between the first contact portion 76 and the cylindrical film in the Y direction is represented by WL. The contact width WS of the second contact portion 77 may be narrower than the contact width WL of the first contact portion 76.

The heater unit 40 illustrated in FIG. 3 comes into contact with the cylindrical film 35 and heats the cylindrical film 35. The cylindrical film 35 rotates in the +θ direction and comes into contact with the first guide portion 71 and the plurality of contact portions 76 and 77. Heat from the cylindrical film 35 leaks to the first guide portion 71 and the plurality of contact portions 76 and 77. The first guide portion 71 is uniform in the Y direction, but the plurality of contact portions 76 and 77 are discontinuous in the Y direction. In the +θ direction of the first guide portion 71 and the contact portions 76 and 77, the temperature of the cylindrical film 35 at the same position as the plurality of contact portions 76 and 77 in the Y direction is low. The temperature of the cylindrical film 35 at a different position from the plurality of contact portions 76 and 77 in the Y direction is high.

The control unit 6 controls the amount of heat generated from the heating element 50 such that the detected temperatures of the film thermometers 67, 68, and 69 approach the target temperatures. It is assumed that all of the plurality of contact portions have the same shape and the film thermometer is disposed at a different position from the contact portion. In this case, even if the temperature of the cylindrical film 35 at a different position from the contact portion approaches the target temperature, the temperature of the cylindrical film 35 at the same position as the contact portion is significantly lower than the target temperature. On the other hand, it is assumed that all of the plurality of contact portions have the same shape and the film thermometer is disposed at the same position as the contact portion. In this case, even if the temperature of the cylindrical film 35 at the same position as the contact portion approaches the target temperature, the temperature of the cylindrical film 35 at a different position from the contact portion is significantly higher than the target temperature.

The fixing device 30 according to the embodiment includes the cylindrical film 35, the heater unit 40, the film thermometers 67, 68, and 69, the plurality of contact portions 76 and 77, the first contact portion 76, and the second contact portion 77. The heater unit 40 is disposed inside the cylindrical film 35, and includes the heating element 50 of which the longitudinal direction is the axis direction of the cylindrical film 35. The film thermometers 67, 68, and 69 detect the temperature of the cylindrical film 35. The plurality of contact portions 76 and 77 can come into contact with the inner surface of the cylindrical film 35 and are discontinuously disposed distant from each other in the Y direction. Among the plurality of contact portions 76 and 77, the first contact portion 76 is disposed at a different position from the film thermometers 67, 68, and 69 in the Y direction. Among the plurality of contact portions 76 and 77, the second contact portion 77 is disposed at the same position as the film thermometers 67, 68, and 69 in the Y direction. The contact area between the second contact portion 77 and the cylindrical film 35 is less than the contact area between the first contact portion 76 and the cylindrical film 35.

The amount of heat leaking from the cylindrical film 35 to the second contact portion 77 is less than the amount of heat leaking to the first contact portion 76. As illustrated in the graph of FIG. 6, the temperature of the cylindrical film 35 at the same position as the second contact portion 77 in the Y direction is higher than the temperature of the cylindrical film 35 at the same position as the first contact portion 76, and is lower than the temperature of the cylindrical film 35 at a different position from the plurality of contact portions 76 and 77. The control unit 6 controls the amount of heat generated from the heating element 50 such that the temperature of the cylindrical film 35 at the same position as the second contact portion 77 approaches the target temperature. A difference between the temperature of the cylindrical film 35 at the same position of the first contact portion 76 and the target temperature is small. A difference between the temperature of the cylindrical film 35 at a different position from the plurality of contact portions 76 and 77 and the target temperature is also small. The cylindrical film 35 can be controlled to an appropriate temperature.

The plurality of contact portions 76 and 77 may be a plurality of ribs. The fixing device 30 further includes the guide portions 71 and 72. The guide portions 71 and 72 are disposed between the heater unit 40 and the plurality of ribs in the θ direction of the cylindrical film 35, and can come into contact with the inner surface of the cylindrical film 35. The plurality of ribs extend from the guide portions 71 and 72 in the θ direction. The guide portions 71 and 72 and the plurality of ribs guide the rotation of the cylindrical film 35 having a substantially cylindrical shape.

In the θ direction, the contact length CS between the second contact portion 77 and the cylindrical film 35 is shorter than the contact length CL between the first contact portion 76 and the cylindrical film 35. In the Y direction, the contact width WS between the second contact portion 77 and the cylindrical film 35 is narrower than the contact width WL between the first contact portion 76 and the cylindrical film 35. Due to these configurations, the contact area between the second contact portion 77 and the cylindrical film 35 is less than the contact area between the first contact portion 76 and the cylindrical film 35.

The heating element 50 includes the plurality of heating element segments 51, 52, and 53 disposed parallel to the Y direction. The film thermometers 67, 68, and 69 are disposed at different positions from a boundary portion between the plurality of heating element segments 51, 52, and 53 in the Y direction. In the Y direction, the second contact portion 77 is disposed at the position of the film thermometers 67, 68, and 69. In the Y direction, the second contact portion 77 is disposed at a different position from a boundary portion (e.g., a boundary area) between the plurality of heating element segments 51, 52, and 53. A significant decrease in the temperature of the cylindrical film 35 is suppressed.

The fixing device 30 further includes the support member 70. The support member 70 is provided inside the heater unit 40 in the radial direction of the cylindrical film 35 and supports the heater unit 40. The plurality of contact portions 76 and 77 are integrated with the support member 70 (e.g., integrally formed as a single, continuous piece). The cost of the fixing device 30 is suppressed. The guide of the cylindrical film 35 by the plurality of contact portions 76 and 77 is stable.

The film thermometers 67, 68, and 69 detect the temperature of the cylindrical film 35 disposed downstream of the second contact portion 77 in the rotation direction of the cylindrical film 35. Heat leaks from the cylindrical film 35 to the second contact portion 77. The film thermometers 67, 68, and 69 detect the temperature of the cylindrical film 35 after the heat leaks to the second contact portion 77. The control unit 6 controls the amount of heat generated from the heating element 50 such that the detected temperatures of the film thermometers 67, 68, and 69 approach the target temperatures. The cylindrical film 35 can be controlled to an appropriate temperature.

The plurality of contact portions 76 and 77 are disposed at opposite sides of the heater unit 40 in the θ direction. The plurality of contact portions 76 and 77 are disposed upstream and downstream of the heater unit 40 in the rotation direction of the cylindrical film 35. The guide of the cylindrical film 35 by the plurality of contact portions 76 and 77 is stable.

The film thermometers 67, 68, and 69 are thermistors that come into contact with the cylindrical film 35 and detect the temperature of the cylindrical film 35. The cost of the film thermometers 67, 68, and 69 is suppressed. The detection accuracy of the temperature of the cylindrical film 35 is improved.

The film thermometers 67, 68, and 69 according to the embodiment are contact thermometers. In other embodiments, the film thermometers 67, 68, and 69 are non-contact thermometers. The non-contact thermometers can detect the temperature of the cylindrical film 35 from the outer side of the cylindrical film 35. If the cylindrical film 35 is conductive, the non-contact thermometer can secure electrical insulating properties from the cylindrical film 35.

Figure 9:
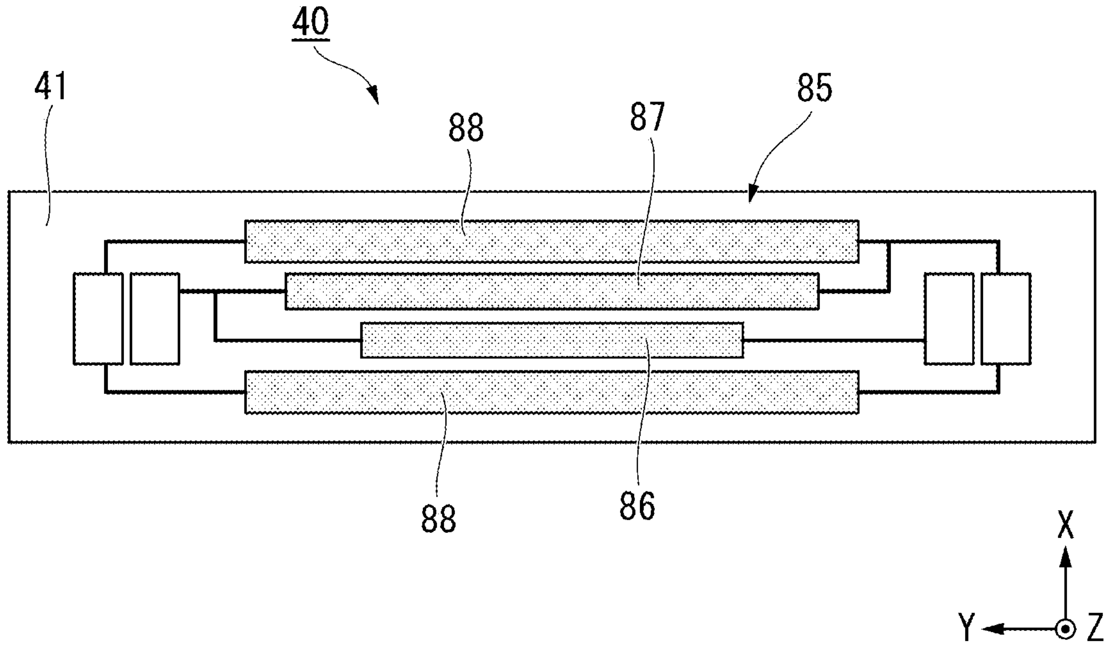
FIG. 9 is a side view illustrating a heater unit according to a first modification example of the embodiment.

A first modification example of the embodiment will be described. FIG. 9 is a side view illustrating the heater unit 40 according to the first modification example of the embodiment. Regarding the same points as those of the embodiment, the description of the first modification example will not be repeated in some cases. The heater unit 40 according to the first modification example includes a heating element 85 on the surface of the substrate 41. The heating element 85 is elongated in the Y direction. The heating element 85 has a plane-symmetrical shape with respect to an XZ plane at the center of the substrate 41 in the Y direction.

The heating element 85 includes a first sub-heater 86, a second sub-heater 87, and a pair of main heaters 88. Each of the first sub-heater 86, the second sub-heater 87, and the pair of main heaters 88 has a rectangular shape of which a longitudinal direction is the Y direction. The pair of main heaters 88 are disposed in opposite end portions of the substrate 41 in the X direction. The first sub-heater 86 and the second sub-heater 87 are disposed in a center portion of the substrate 41 in the X direction. Regarding the length of the heating element 85 in the Y direction, the first sub-heater 86 is the shortest, and the pair of main heaters 88 are the longest. The length of the second sub-heater 87 in the Y direction is longer than that of the first sub-heater 86 and is shorter than that of the pair of main heaters 88.

For example, if the fixing process is executed on the sheet S having a small width in the Y direction, the control unit 6 causes the first sub-heater 86 or the second sub-heater 87 to generate heat. For example, if the fixing process is executed on the sheet S having a large width in the Y direction, the control unit 6 causes the pair of main heaters 88 to generate heat. All of the heaters in the heating element 85 are disposed in the center portion of the substrate 41 in the Y direction. Irrespective of the size of the sheet S, the center portion of the heater unit 40 in the Y direction generates heat.

The heater unit 40 according to the first modification example may be adopted instead of the heater unit 40 according to the embodiment illustrated in FIG. 6. Even in this case, the cylindrical film 35 can be controlled to an appropriate temperature as in the embodiment.

Figure 10:
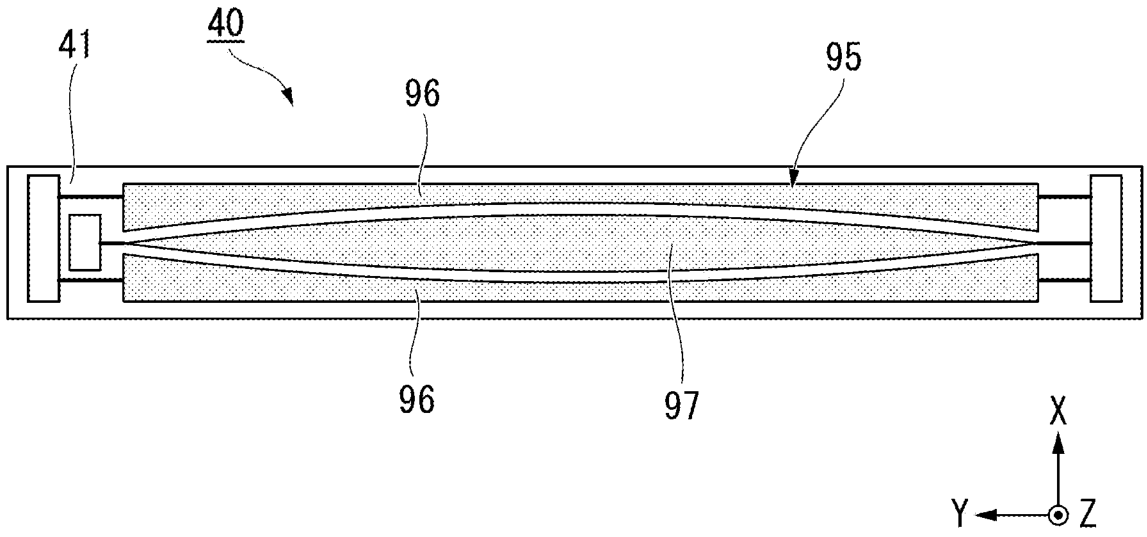
FIG. 10 is a side view illustrating a heater unit according to a second modification example of the embodiment.

A second modification example of the embodiment will be described. FIG. 10 is a plan view illustrating a heater unit 40 according to the second modification example of the embodiment. Regarding the same points as those of the embodiment, the description of the second modification example will not be repeated in some cases. The heater unit 40 according to the second modification example includes a heating element 95 on the surface of the substrate 41. The heating element 95 is long in the Y direction. The heating element 95 has a plane-symmetrical shape with respect to an XZ plane at the center of the substrate 41 in the Y direction.

The heating element 95 includes a pair of main heaters 96 and a sub-heater 97. The pair of main heaters 96 are disposed in opposite end portions of the substrate 41 in the X direction. The sub-heater 97 is disposed in the center portion of the substrate 41 in the X direction. The lengths of the pair of main heaters 96 and the sub-heater 97 in the Y direction are the same. The width of the main heaters 96 in the X direction is small in the center portion in the Y direction and increases from the center portion toward the opposite end portions in the Y direction. The amount of heat generated from the main heaters 96 is large in the center portion in the Y direction and decreases from the center portion toward the opposite end portions in the Y direction. The width of the sub-heater 97 in the X direction is large in the center portion in the Y direction and decreases from the center portion toward the opposite end portions in the Y direction. The amount of heat generated from the sub-heater 97 is small in the center portion in the Y direction and increases from the center portion toward the opposite end portions in the Y direction.

For example, if the fixing process is executed on the sheet S having a small width in the Y direction, the control unit 6 causes the pair of main heaters 96 to generate heat. For example, if the fixing process is executed on the sheet S having a large width in the Y direction, the control unit 6 causes the pair of main heaters 96 and the sub-heater 97 to generate heat. In the second modification example, the pair of main heaters 96 generate heat irrespective of the size of the sheet S. The amount of heat generated from the pair of main heaters 96 is large in the center portion in the Y direction.

The heater unit 40 according to the second modification example may be adopted instead of the heater unit 40 according to the embodiment illustrated in FIG. 6. Even in this case, the cylindrical film 35 can be controlled to an appropriate temperature as in the embodiment.

The second contact portion 77 according to the embodiment is disposed at the same position as the film thermometers 67, 68, and 69 in the Y direction. On the other hand, the second contact portion 77 may be disposed at the same position as the heater thermometers 61 and 62 or the thermostats 64 and 65 in the Y direction.

In at least one of the embodiments described above, the second contact portion 77 is disposed at the same position as the film thermometers 67, 68, and 69 in the Y direction. The contact area between the second contact portion 77 and the cylindrical film 35 is less than the contact area between the first contact portion 76 and the cylindrical film 35. As a result, the cylindrical film 35 can be controlled to an appropriate temperature.

While certain embodiments have been described these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A fixing device comprising:
- a film forming a cylinder;
- a heater extending within the cylinder and including a heating element that extends in a longitudinal direction along the cylinder;
- a thermometer configured to detect a temperature of the cylinder; and
- a plurality of contact portions configured to contact an inner surface of the cylinder and spaced apart from each other in the longitudinal direction, the plurality of contact portions including:
  - a first contact portion longitudinally offset from the thermometer and having a first contact area with the cylinder, the first contact portion contacting the inner surface of the cylinder along a first contact length measured in a circumferential direction of the cylinder; and
  - a second contact portion colocated with the thermometer in the longitudinal direction and having a second contact area with the cylinder, the second contact area being smaller than the first contact area, the second contact portion contacting the inner surface of the cylinder along a second contact length measured in the circumferential direction, and the second contact length being shorter than the first contact length.

2. The fixing device of claim 1, wherein:
- the plurality of contact portions are a plurality of ribs; and
- the fixing device further comprises a guide that extends between the heater and the plurality of ribs in the circumferential direction of the cylinder and that contacts the inner surface of the cylinder.

3. The fixing device of claim 2, wherein the plurality of ribs extend from the guide in the circumferential direction.

4. The fixing device of claim 3, wherein the ribs and the guide are integrally formed as a single, continuous piece.

5. The fixing device of claim 1, wherein:

the first contact portion contacts the inner surface of the cylinder along a first contact width measured in the longitudinal direction;

the second contact portion contacts the inner surface of the cylinder along a second contact width measured in the longitudinal direction; and the second contact width is narrower than the first contact width.

6. The fixing device of claim 1, wherein:

the heating element includes a plurality of heating element segments extending parallel to the longitudinal direction, and the thermometer is longitudinally offset from a boundary area extending between the plurality of heating element segments in the longitudinal direction.

7. The fixing device of claim 1, further comprising a support member configured to support the heater, the support member extending radially inward from the heater relative to an axis of rotation of the cylinder.

8. The fixing device of claim 7, wherein the plurality of contact portions and the support member are integrally formed as a single, continuous piece.

9. The fixing device of claim 7, wherein:

the fixing device further comprises a guide that extends between the heater and the plurality of contact portions in the circumferential direction of the cylinder and that contacts the inner surface of the cylinder; and the support member, the plurality of contact portions, and the guide are integrally formed as a single, continuous piece.

10. The fixing device of claim 1, wherein the thermometer is positioned to detect the temperature of the cylinder at a position downstream of the second contact portion relative to a rotation direction of the cylinder.

11. The fixing device of claim 1, wherein at least one of the contact portions extends upstream of the heater in a rotation direction of the cylinder, and at least one of the contact portions extends downstream of the heater in the rotation direction.

12. The fixing device of claim 1, wherein the thermometer is a thermistor that contacts the cylinder and detects the temperature of the cylinder.

13. The fixing device of claim 1, wherein the plurality of contact portions further includes a third contact portion having a third contact area with the cylinder, the third contact area being less than the first contact area.

14. The fixing device of claim 13, wherein the thermometer is a first thermometer, further comprising a second thermometer colocated with the third contact portion in the longitudinal direction.

15. The fixing device of claim 1, wherein the plurality of contact portions further includes a third contact portion having a third contact area with the cylinder, the third contact area being greater than the first contact area.

16. The fixing device of claim 1, further comprising a pressurization roller positioned to press the cylinder toward the heater.

17. A fixing device comprising:

a film forming a cylinder;

a heater extending within the cylinder and including a heating element that extends in a longitudinal direction along the cylinder;

a first thermometer configured to detect a temperature of the cylinder;

a second thermometer; and a plurality of contact portions configured to contact an inner surface of the cylinder and spaced apart from each other in the longitudinal direction, the plurality of contact portions including:

a first contact portion longitudinally offset from the first thermometer and having a first contact area with the cylinder;

a second contact portion colocated with the first thermometer in the longitudinal direction and having a second contact area with the cylinder, the second contact area being smaller than the first contact area; and a third contact portion having a third contact area with the cylinder, the third contact area being less than the first contact area, and the second thermometer being colocated with the third contact portion in the longitudinal direction.

18. The fixing device of claim 17, wherein:

the plurality of contact portions are a plurality of ribs; and the fixing device further comprises a guide that extends between the heater and the plurality of ribs in a circumferential direction of the cylinder and that contacts the inner surface of the cylinder.

19. The fixing device of claim 17, wherein at least one of the contact portions extends upstream of the heater in a rotation direction of the cylinder, and at least one of the contact portions extends downstream of the heater in the rotation direction.

20. The fixing device of claim 17, wherein at least one of the first thermometer or the second thermometer is a thermistor that contacts the cylinder and detects the temperature of the cylinder.

* * * * *